United States Patent [19]

Kresse, Jr.

[11] Patent Number: 5,389,761
[45] Date of Patent: Feb. 14, 1995

[54] METHOD AND APPARATUS FOR CLEANING METAL PIECES PRIOR TO RESISTIVE SEAM WELDING OR LASER LAP SEAM WELDING

[75] Inventor: Alfred L. Kresse, Jr., Romeo, Mich.

[73] Assignee: General Motors Corporation, Detroit, Mich.

[21] Appl. No.: 122,086

[22] Filed: Sep. 17, 1993

[51] Int. Cl.$^6$ ............... B23K 11/34; B23K 11/08; B23K 26/00

[52] U.S. Cl. ................. 219/78.14; 29/81.06; 29/81.07; 29/81.09; 134/5; 134/37; 219/117.1; 219/121.63; 228/20.1; 228/205

[58] Field of Search ............... 228/17, 20.1, 34, 164, 228/203, 205, 218, 219; 219/81, 82, 83, 78.14, 117.1, 118, 121.63, 121.64, 50, 68; 134/1, 5, 37; 29/81.01, 81.06, 81.07, 81.09

[56] References Cited

U.S. PATENT DOCUMENTS

| | | | |
|---|---|---|---|
| 1,707,405 | 4/1929 | Lunn | 219/78.14 |
| 2,390,971 | 12/1945 | Vang | 219/78.14 |
| 2,435,441 | 2/1948 | Grouse | 117/102 |
| 2,477,411 | 7/1949 | King | 29/81.01 |
| 3,278,720 | 10/1966 | Dixon | 219/118 |
| 3,591,754 | 7/1971 | Baldwin, Jr. | 219/50 |
| 3,761,672 | 9/1973 | Baker et al. | 219/68 |
| 3,895,208 | 7/1975 | Kraus | 219/68 |
| 3,992,602 | 11/1976 | Ashton | 219/118 |
| 4,135,075 | 1/1979 | Heflin | 219/78.14 |
| 4,228,570 | 10/1980 | Chamberlin et al. | 29/33 |
| 4,425,496 | 1/1984 | le Fur et al. | 219/384 |
| 4,642,446 | 2/1987 | Pennington | 219/121.64 |
| 4,873,415 | 10/1989 | Johnson et al. | 219/121.64 |
| 5,061,837 | 10/1991 | Gilbert et al. | 219/68 |
| 5,104,032 | 4/1992 | Spies et al. | 228/203 |
| 5,122,629 | 6/1992 | Stieger | 219/81 |

FOREIGN PATENT DOCUMENTS

| | | | |
|---|---|---|---|
| 54-148150 | 11/1979 | Japan | 219/117.1 |
| 55-36051 | 3/1980 | Japan | 219/117.1 |
| 60-177976 | 9/1985 | Japan | 219/117.1 |
| 3-5090 | 1/1991 | Japan | 219/121.64 |

OTHER PUBLICATIONS

Electrical & Metallurgical Characteristics of Mash Seam Welds, Bulletin No. 21, Resistance Welder Manufacturers Assoc., Published by Permission From The Welding Journal May 1956.

Metals Handbook, Welding & Brazing (vol. 6); 8th Edition American Society for Metals, Aug. 1971, pp. 425–434.

"An Arc-Cleaning Approach for Resistance Welding Aluminum", by Ashton et al., pp. 750–757, Sep. 1976 of *Welding Journal*.

Primary Examiner—Geoffrey S. Evans
Attorney, Agent, or Firm—Anthony L. Simon

[57] ABSTRACT

An apparatus comprises a current source, first and second wheels through which a current from the current source selectively flows, and a source of gas, wherein the first and second wheels receive first and second pieces of metal having overlapping portions, force the first and second pieces of metal together at said overlapping portions. The current from the current source flows through the first and second wheels in the overlapping portions of the first and second pieces of metal, generating heat in said first and second pieces of metal sufficient to melt a coating on the first and second sheets of metal where the first and second sheets of metal contact and overlap. The source of gas comprises removes said melted coatings away from the overlapping portions of metal to clean the metal surfaces in preparation for movement to a weld station where the pieces of metal are resistive seam welded or laser lap seam welded. Preferably the source of gas supplies an inert gas to prevent reoxidation of the pieces between the apparatus and the weld station.

14 Claims, 4 Drawing Sheets

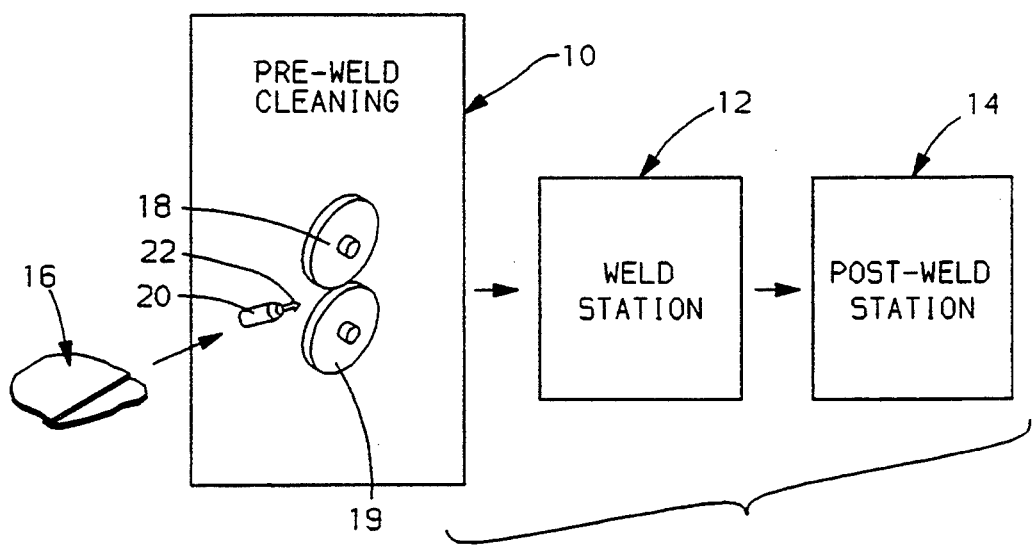
FIG. 1
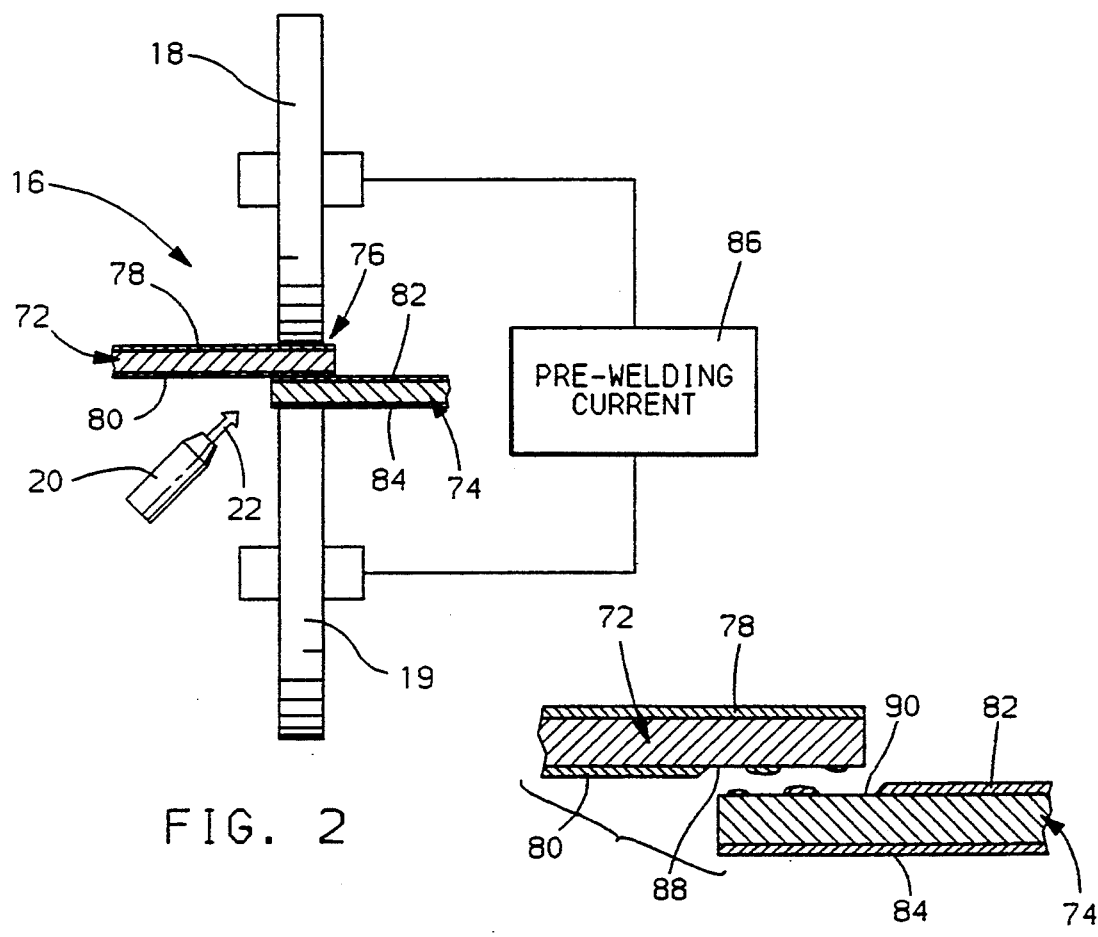
FIG. 2
FIG. 3

METHOD AND APPARATUS FOR CLEANING METAL PIECES PRIOR TO RESISTIVE SEAM WELDING OR LASER LAP SEAM WELDING

This invention relates to a method of mash or lap welding metal, and more particularly of welding coated and/or oxidized metals.

BACKGROUND OF THE INVENTION

Many modern day metals, such as those used in automobiles, are coated with one or more materials because the coatings are desired by the users of the metal to increase durability, reduce corrosion, etc. One example of a coated metal is galvanized steel. When a first piece of metal to be welded to a second piece of metal has a coating, the coating may be a factor that affects the weld process and may make the welding more difficult.

Additionally, if the coating weight and thickness varies along the surface of the metals, optimizing the weld process may be difficult and uniform welding may be hard to obtain.

Another element affecting welding of metals is that different oxides are formed at grain boundary surfaces and the oxidation points can affect functional part durability and fatigue strength of the weld.

Known methods of joining two pieces of sheet metal include resistance mash seam welding and laser lap welding.

SUMMARY OF THE PRESENT INVENTION

Advantageously, the method of this invention provides an improved process for seam welding two pieces of coated metal together. Advantageously, this invention provides a process of seam welding galvanized steel with improved uniformity. Advantageously, this invention provides a process of seam welding coated metals that eliminates the coating as a source of process variation.

Advantageously, this invention provides an improved method for the resistive mash welding of sheets of coated metal.

Advantageously, this invention provides an improved process for the laser lap welding of coated metal pieces.

Advantageously, this invention provides an improved method for welding metals that are susceptible to the formation of oxides on portions of, or all of, their outer layers.

Advantageously, the method of this invention comprises placing first and second pieces of metal so that each of the pieces of metal overlaps at least a portion of the other piece of metal, wherein at least one of the first and second pieces of metal comprises an additional material on an overlapping surface of said one piece of metal. A current is provided through the overlapping portions, wherein the current flows through the overlapping portions, heating the metal and additional material and creating a fluid melt zone. A stream of gas flows at said fluid melt zone to remove from a vicinity of the overlapping portions at least a portion of fluid melt zone and at least a portion of the additional material. Thereafter, the first and second pieces of metal are seam welded at said overlapping portions, whereby surface oxidations and coatings have minimal affect on weld results.

A more detailed description of this invention along with various embodiments thereof is set forth below.

BRIEF DESCRIPTION OF THE DRAWINGS

FIG. 1 illustrates the welding process of this invention.

FIG. 2 illustrates an apparatus for performing the preweld cleaning according to this invention.

FIG. 3 illustrates first and second pieces of metal after they have been through the preweld station.

DETAILED DESCRIPTION OF THE INVENTION

Figure 4:
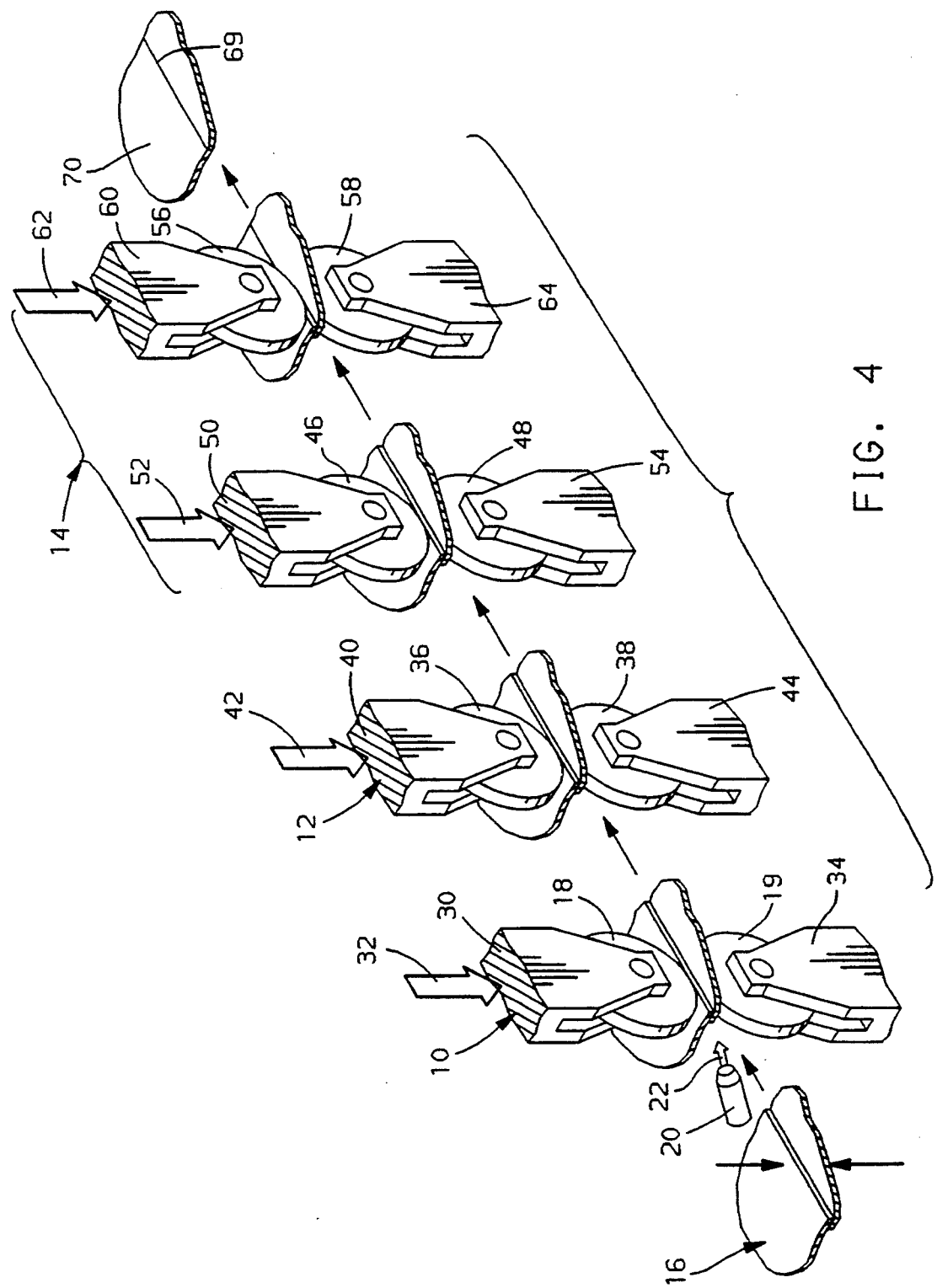
FIG. 4 illustrates an example weld process according to this invention.

Referring to FIG. 1, two pieces of sheet metal 16, such as galvanized steel, are processed according to this invention first by preweld cleaning the portions of the metal to be welded together at preweld station 10, described in detail further below. The two pieces of metal 16 are then seam welded at weld station 12. An optional post-weld processing station 14 may also be implemented to post-weld process the welded metal in a manner well known to those skilled in the art, if so desired.

More particularly, the two pieces of metal 16 are fit into a fixture (not shown) that clamps the metal so that each metal overlaps the other piece of metal. The fixture may be, for example, offset rollers of a type well known to those skilled in the art of seam welding. The rollers allow the metal to move through the preweld, weld and post-weld stations 10, 12 and 14, while maintaining the pieces of metal 16 so that they overlap.

In the preweld station 10, the overlapping portion of the pieces of metal 16 are fed through preweld cleaning rollers 18 and 19. Rollers 18 and 19 are metal rollers similar to the type used in roller mash seam welding and are provided with an electric current. The contact force between the two pieces of metal 16 is enough to maintain electrical contact but is less than that required by the typical resistance mash or seam weld station. The electric current flows through the overlapping portions of the metal 16 and, when travelling through the metal, generates at least enough heat to melt and/or vaporize the coatings, such as galvanization layers, at the overlapping interface between the two pieces of metal 16. At least one nozzle 20 is provided with a flow of gas 22, preferably inert, which blows away the melted material between the overlapping portions of metal. Clamping by rollers, etc., provides minimal forces normal to the planes of the two pieces of metal 16 to allow a gap to form after the metal comes out of the rollers to allow the gas to escape. In some implementations, a plurality of nozzles 20, in various positions, may be desired.

In an alternative implementation, the two pieces of metal do not physically contact at the rollers 18 and 19, but are positioned in close proximity to each other so that the current provided through the rollers forms an arc (either DC or AC, whichever is desired) across the gap between the two pieces of metal 16. The arcing of the current generates heat to melt and/or vaporize a coating at the facing surfaces of the two pieces of metal. Alternatively the arcing current melts a portion of the metal itself, which portion is blown away by the inert gas, carrying away surface oxidation, etc.

Pre-weld station 10 may be better understood with reference to FIG. 2.

Referring to FIG. 2, weld current supply 86, of a type well known to those skilled in the art, is adjusted to provide current to rollers 18 and 19 at a level less than a weld current level. The two pieces of metal 16 are designated 72 and 74 and the overlapping portion 76 is shown. In the illustrated example, each piece of metal has two sides of coatings. Piece 72 has a coating 78 on a first side and a coating 80 on the second side. Piece 74 has a coating 82 on the first side and a coating 84 on the second side. The portions of coatings 80 and 82 at the overlapping portion 76 of the two pieces of metal 72 and 74 are removed by the cleaning step of this invention as follows.

The electric current from the current supply 86 is provided so that the heat generated by the current travelling through the overlapping portion 76 of metal 72 and metal 74 at least melts the coatings at the interface of the two sheets of metal. Some of the coating material may also be vaporized. The current may or may not be enough to melt a portion of the metal also. The exact current used will depend on the thickness of the sheets of metal 72 and 74, the type of metal, the force of the rollers pressing the two sheets of metal together, and upon the type of coating desired to be removed. Inert gas 22 in the form of a stream from nozzle 20 is forced into the region of melted and/or vaporized material and acts as a means for blowing the melted/vaporized material from region 76 away from the two pieces of metal 72 and 74. Either a gap between the two pieces of metal is maintained, in the case of arcing described above, or the force on the two piece of metal is released as they come out of rollers 18 and 19, allowing a gap between the two pieces of metal so that the material melted and/or vaporized may escape.

Referring to FIG. 3, the two pieces of metal 72 and 74 are shown having gone through the pre-weld cleaning station according to this invention, and have surfaces 88 and 90 from which the coatings 80 and 82 have been substantially removed. Surfaces 88 and 90 are next welded together at a weld station (described below) so that a clean weld, unaffected by a coating on the metal, may be achieved.

Referring now to FIG. 4, a weld system according to this invention for resistance mash seam welding together the two pieces of metal 16 is shown. The first station 10 is the preweld cleaning station described above. Rollers 18 and 19 are mounted on supports 30 and 34 and roller 18 provides a force 32 that presses the two pieces of metal together. The amount of force 32 may affect the resistance where the two pieces of metal contact each other and will vary from implementation to implementation.

As the two pieces of metal travel through rollers 18 and 19, current flows through the metal in the cleaning process melting and/or evaporating the coatings on the contacting or the proximate portions of the metal pieces so that the melted and/or evaporated material may be removed by the gas flow.

The weld station 12 comprises resistance mash seam weld rollers 36 and 38 through which a current from a welding current supply flows to provide resistance mash seam welding of the metal pieces 16 that have been through the preweld cleaning station 10. Rollers 36 and 38 are mounted in fixtures 40 and 44 and roller 36 provides force 42, which is a relatively high force compared to force 32 in the preweld cleaning station 10, against roller 38. Force 42 forces the two pieces of metal 16 together for the mash seam welding process in a manner well known to those skilled in the art.

The post-weld station 14 is of a type well known to those skilled in the art. For example, wheel 46 is mounted in fixture 50 that provides a force 52 forcing wheel 46 against wheel 48, which is fixedly supported by support 54. The supported wheels 46 and 48 may comprise a planishing or cold work flattening station for flattening the weld resulting from weld station 12.

Wheel 56, mounted in fixture 60, has a force 62 provided by fixture 60, forcing wheel 56 against wheel 58, which is supported in fixture 69. The wheels 56 and 58 may comprise an annealing or tempering station in which heated wheels 56 and 58 temper the weld from the welding station 12 that was flattened by wheels 46 and 48.

The result of the two pieces of metal 16 being welded together comprises a single piece of metal 70 having a seam weld 69.

The apparatus illustrated above in FIG. 4 is shown schematically. All of components necessary to construct the above described apparatus, including the fixture (not shown) holding the two pieces of metal 16 in position and transferring the two pieces of metal between the work stations, the wheels 18, 19, 36, 38, 46, 48, 56, and 58, and the supports 30, 34, 40, 44, 50, 54, 60 and 64 are well known to those skilled in the art and are of the type commonly used in resistance mash seam welding.

Figure 5:
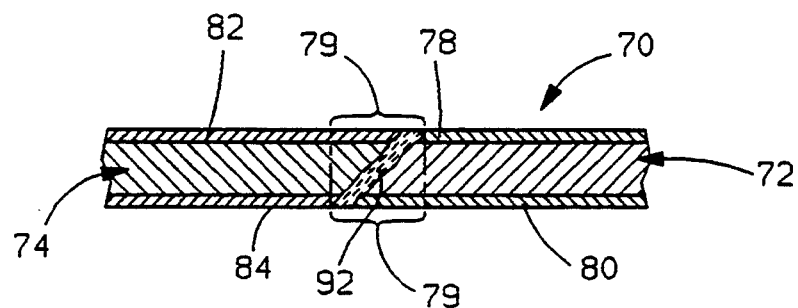
FIG. 5 illustrates an example mash seam weld according to this invention.

Referring now to FIG. 5, a cut away view of the weld seam illustrates the weld zone 92, which, in the example of galvanized steel welding according to this invention, is a clean steel-to-steel weld of metal pieces 72 and 74. Metal pieces 72 and 74 still retain their protective coatings 78, 80, 82 and 84 at regions outside the weld itself. Depending upon the amount of preweld and weld current, coating portions 79 may be partially or completely vaporized in the preweld and/or weld stations.

Thus, according to this invention, a resistance mash seam weld is provided that minimizes or eliminates weld variations caused by the coating on the metal at the weld Joint, which weld variations may otherwise affect the weld joint.

Figure 6:
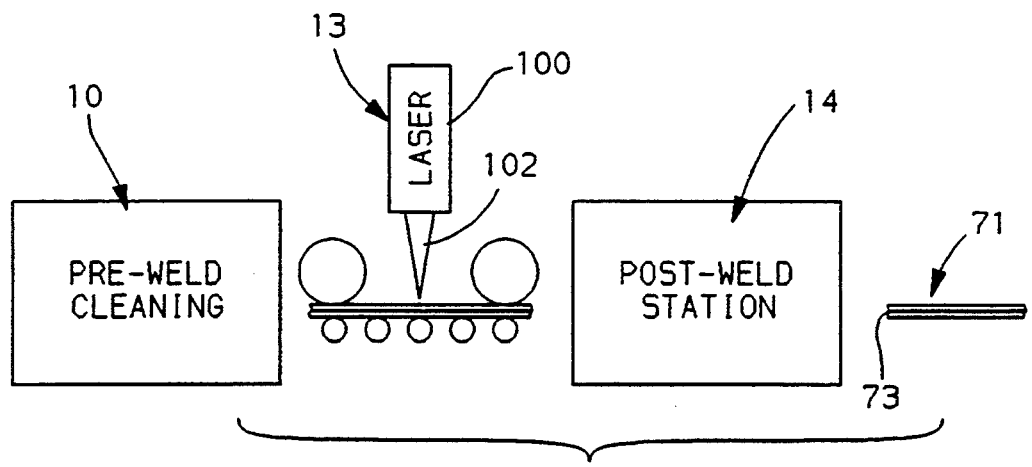
FIG. 6 illustrates another example weld process according to this invention.

Referring now to FIG. 6, a weld process according to this invention for laser lap welding is shown. The two pieces of metal 16 are fed through the cleaning apparatus 10 to perform the preweld cleaning step according to this invention.

The two pieces of metal 16 are then passed through a laser lap weld station 13 where a laser beam 102 from a laser device 100 welds the overlapping portions of two pieces of metal that have been cleaned in the preweld cleaning station 10. Because the cleaning station 10 removed the coatings at the portions of the metal that overlap each other, the coatings do not interfere with the laser lap welding. The laser lap welding may then be performed in a manner well known to those skilled in the art with minimum or no gap between the overlapping portions of the two pieces of metal.

After the laser lap welding, the post-weld stations 14 may be used for post-weld processing in a manner well known to those skilled in the art. The result is a single place of welded material 71 having a laser lap weld 73 Joining the original two pieces of metal together.

Figure 7:
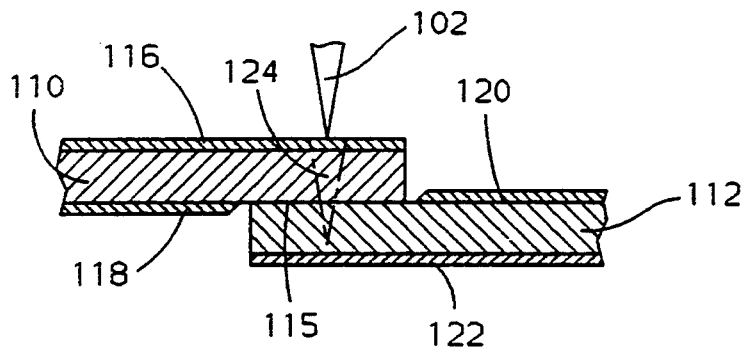
FIG. 7 illustrates the laser weld operation according to this invention.

Referring to FIG. 7, a view of the lap weld is shown with first piece of metal 110 and second piece of metal 112 having coatings 116, 118, 120 and 122. At the preweld station 10, the coatings were removed at portion 115 where the two pieces of metal overlap and meet. Reference 124 illustrates the keyhole and weld zone of the two pieces of metal in the laser lap weld station caused by laser beam 102.

Figure 8:
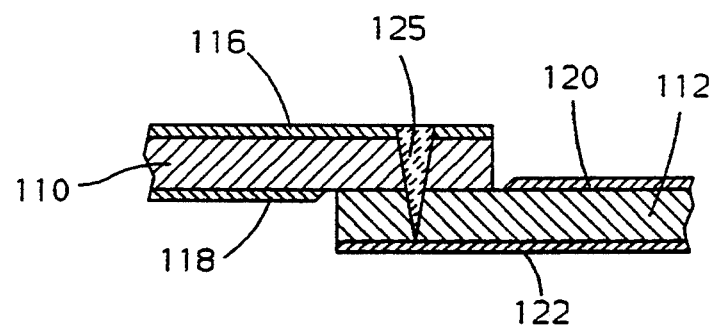
FIG. 8 illustrates two pieces of metal laser lap welded according to this invention.

FIG. 8 illustrates the two pieces of metal, 110 and 112, laser welded together with a weld seam 125 holding the pieces of metal together in a lap weld. Where the two pieces of metal are welded, the coatings have been removed by the cleaning process in a cleaning station 10.

Thus, advantageously according to this invention, two pieces of coated metal, such as galvanized steel, are laser lap welded in a manner that eliminate the effects of the coatings, such as galvanization layers, on the weld joint.

This invention may also be used for the welding of non-coated metals and is beneficial for the welding of metals that tend to develop oxidation on their outer surfaces. To prevent surface oxidation from becoming a factor of the welding process, this invention removes the oxidation layer from the weld area in the pre-welding step according to this invention.

More particularly, many types of metal, such as steel and other alloys have a granular nature, comprise grains and grain boundary areas between the grains. It is known that some types of metals and alloys tend to oxidize at the grain boundary so that a partial or complete layer of surface oxidation forms.

Figure 9:
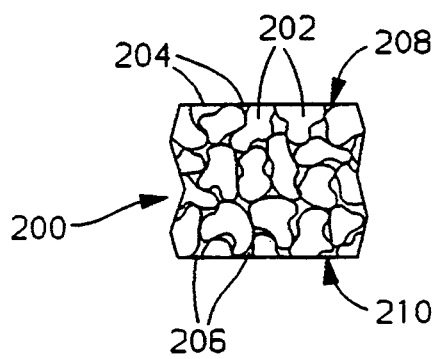
FIG. 9 illustrates a cross section of a granular metal alloy.

Referring to FIG. 9, a cross section of a portion of an alloy sheet 200, such as steel, is shown comprising grains 202 and grain boundaries 204 and 206. The portions of the grain boundaries at the surfaces 208 and 210 of the steel 200 tend to oxidize, forming a partial layer of surface oxidation.

Figure 10:
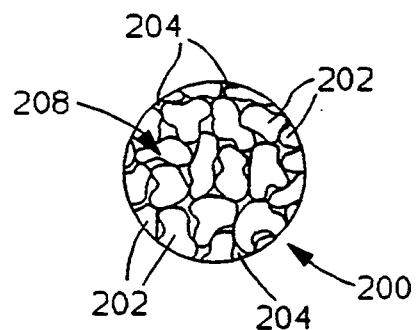
FIG. 10 illustrates a view of a top surface of the granular metal alloy.

FIG. 10 illustrates a portion of the top surface 208 of steel 200, and grain boundaries 204, which form a partial oxidation layer on the surface 208 of steel 200.

Figure 11:
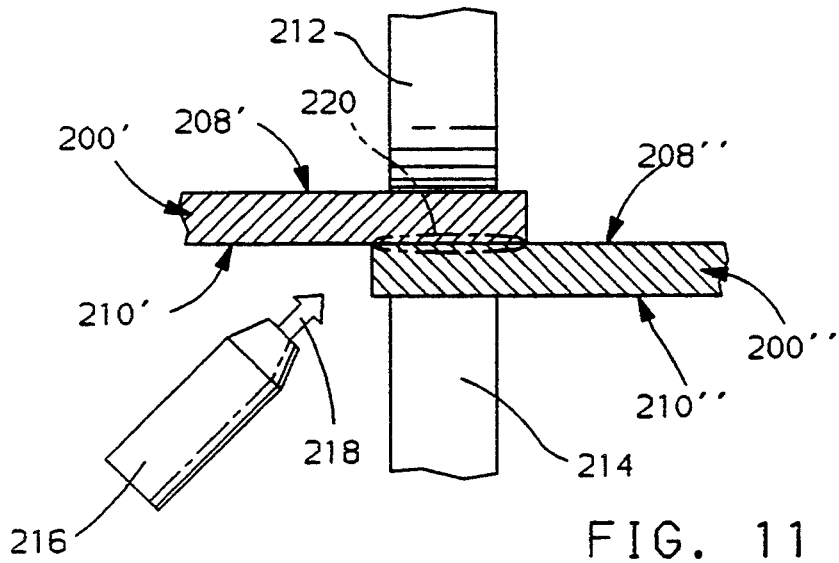
FIG. 11 illustrates an example cleaning station according to this invention.

Referring to FIG. 11, in the cleaning station for removing an oxidation layer from a metal such as steel, two sheets of steel 200' and 200" are passed through rollers 212 and 214. A current supply, not shown, is attached to the rollers and provides a current through the rollers 212 and 214 of sufficient intensity to melt zone 200 of the two pieces of metal 200' And 200". Inert gas 218 from at least one jet nozzle 216 is flowed into the melt zone 220. The force of the flowing gas on the melted metal in the melt zone 220 forces the fluid metal out of the region where the two sheets of steel meet. As the metal is blown out of the overlapping portions of the sheets 200' and 200", surface oxidation on surfaces 210' and 208", at the overlapping region of the sheets 200 and 200", is carried out of the overlapping region with the flowing metal. The oxide molecules themselves are not likely to change into a liquid phase because of the high melting temperature of typical metal oxides. Instead, the oxide molecules flow as solid particles out of region 220 with the flowing metal.

The amount and flow velocity of gas 218 will vary from implementation to implementation and can be easily determined for a particular welding process according to this invention by one skilled in the art in view of the description herein.

Figure 12:
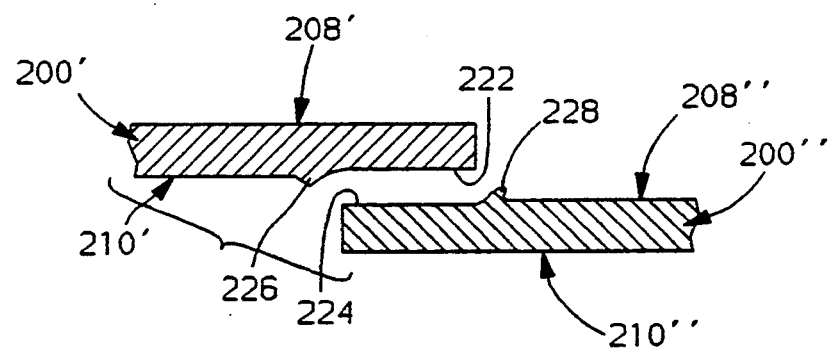
FIG. 12 illustrates two pieces of metal pre-weld cleaned to remove surface oxidation at welding surfaces according to this invention.

FIG. 12 shows the two pieces of metal 200' and 200" after the cleaning station. Surfaces 222 and 224 represent the surfaces from which the oxidation layer has been removed in preparation for welding, either resistive seam welding or laser lap welding as described above. The figure illustrates that build-ups 226 and 228 of re-solidified material may appear outside the region that has been cleaned in preparation for welding. The pieces of metal 200' and 200" should be welded in one of the manners described above immediately following the cleaning process according to this invention to prevent the oxidation of the cleaned surfaces 222 and 224. The residue of the flowing inert gas may bathe the area between the preweld cleaning station and the weld station to impede oxidation of surfaces 222 and 224.

Thus advantageously according to this invention, metals with surface oxidation are preweld cleaned according to this invention to remove surface oxidation on surfaces to be welded, thereby minimizing and/or eliminating surface oxidation as a factor affecting resistive or laser seam welding.

Various other improvements, modifications to this invention may occur to those skilled in the art and such improvements and modifications will fall within the scope of this invention as set forth below.

The embodiments of the invention in which an exclusive property or privilege is claimed are defined as follows:

1. A method comprising the steps of:

placing first and second pieces of metal so that each of the pieces of metal overlaps at least a portion of the other piece of metal and comprises a contacting surface in physical contact with the other piece of metal at the overlapping portion, wherein at least one of the first and second pieces of metal comprises an additional material on the contacting surface;

rolling the overlapping portions of the first and second pieces of metal through a pair of rollers;

providing current through the rollers and the overlapping portions as the overlapping portions are rolled through the pair of rollers, wherein the current heats the metal and additional material and creates a fluid melt zone between the overlapping portions:

flowing a stream of inert gas at said fluid melt zone to remove from between the overlapping portions at least a portion of the fluid melt zone and at least a portion of the additional material as the overlapping portions exit the rollers; and thereafter moving the overlapping portions to a weld station to seam weld the first and second pieces of metal at said overlapping portions, whereby oxidations and coatings have minimal affect on weld results, wherein a residue of the flowing inert gas bathes an area between the rollers and the weld station to impede oxidation of the overlapping portions from which the fluid melt zone and additional material were removed and wherein continuous cleaning and seam welding of the first and second pieces of metal are accomplished.

2. The method of claim 1, wherein said additional material comprises a coating on the contacting surface.

3. The method of claim 2, wherein the fluid melt zone comprises said additional material.

4. The method of claim 1 wherein the at least one of the first and second pieces of metal comprises steel and the additional material comprises a galvanization layer.

5. The method of claim 4, wherein the fluid melt zone comprises the galvanization layer.

6. The method of claim 1, wherein the additional material comprises oxidized molecules of the at least one of the first and second pieces of metal.

7. The method of claim 6, wherein the fluid melt zone comprises fluid metal of said first and second pieces of metal in the vicinity of the overlapping portions and wherein at least some of the oxidized molecules are carried away from the vicinity of the overlapping portions by the fluid metal removed by the stream of gas.

8. The method of claim 1, wherein the fluid melt zone comprises metal of said first and second pieces of metal in the vicinity of the overlapping portions.

9. The method of claim 1, wherein the fluid melt zone comprises said additional material.

10. The method of claim 1, wherein the both of the first and second pieces of material comprise the additional material on the contacting surfaces.

11. The method of claim 1, wherein the seam welding step is resistive seam welding.

12. The method of claim 1, wherein the seam welding step is laser lap seam welding.

13. The method of claim 1, wherein the current vaporizes at least a portion of the additional material and wherein the stream of gas removes the vaporized portion from the vicinity of the overlapping portions.

14. An apparatus for seam welding comprising:
a preweld cleaning station comprising:
  (a) a set of wheels through which first and second pieces of metal are rolled while the first and second pieces of metal are positioned so that each of the pieces of metal overlaps at least a portion of the other piece of metal and comprises a contacting surface in physical contact with the other piece of metal at the overlapping portion, wherein at least one of the first and second pieces of metal comprises an additional material on the contacting surface;
  (b) a current source coupled to the set of wheels providing current flow through the overlapping portions and the contacting surfaces to heat the overlapping portions and additional material and create a fluid melt zone between the overlapping portions; and
  (c) a source of gas flowing a stream of inert gas at said fluid melt zone to remove from between the overlapping portions at least a portion of the fluid melt zone and at least a portion of the additional material as the fluid melt zone exits the set of wheels; and
a weld station spatially separated from the preweld cleaning station, wherein the first and second pieces of metal travel from the set of wheels to the weld station, wherein a residue of the flowing inert gas bathes an area between the first set of wheels and the weld station to impede oxidation of the overlapping portions from which the fluid melt zone and the additional material were removed, and wherein continuous cleaning and seam welding of the first and second pieces of metal are achieved.

* * * * *